United States Patent [19]

Perryman

[11] Patent Number: 4,462,786
[45] Date of Patent: Jul. 31, 1984

[54] THERMOFORMING APPARATUS

[75] Inventor: Leslie M. Perryman, Huntingdon, England

[73] Assignee: M. L. Shelley & Partners Limited, Cambridgeshire, England

[21] Appl. No.: 408,672

[22] Filed: Aug. 13, 1982

[30] Foreign Application Priority Data

Apr. 13, 1982 [EP] European Pat. Off. ............ 82301900

[51] Int. Cl.³ .............................................. B29C 17/00
[52] U.S. Cl. ................................ 425/388; 425/126 R; 425/143; 425/403.1
[58] Field of Search ............ 425/388, 143, 343, 403.1, 425/126 R

[56] References Cited

U.S. PATENT DOCUMENTS

| 3,561,057 | 2/1971 | Butzko | 425/143 |
| 3,785,762 | 1/1974 | Butzko | 425/388 |
| 3,810,731 | 5/1974 | Anderson | 425/388 |
| 3,954,374 | 5/1976 | Wommelsdorf et al. | 425/388 |
| 4,252,518 | 2/1981 | Kiefer | 425/388 |
| 4,368,022 | 1/1983 | Orii | 425/343 |

Primary Examiner—Donald E. Czaja
Assistant Examiner—Mary A. Becker
Attorney, Agent, or Firm—Murray Schaffer

[57] ABSTRACT

Thermoforming apparatus having a heating station and a forming station provided with upper and lower heaters for softening the thermoplastics sheet material. One of the heaters is movable between the heating and forming stations and is arranged to convey heated sheets from the heating station of the forming station.

12 Claims, 18 Drawing Figures

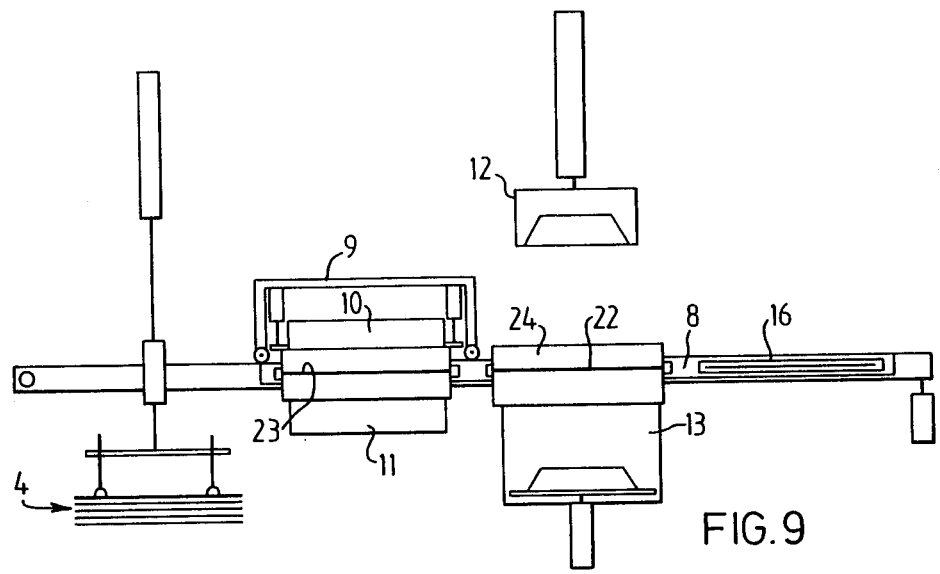
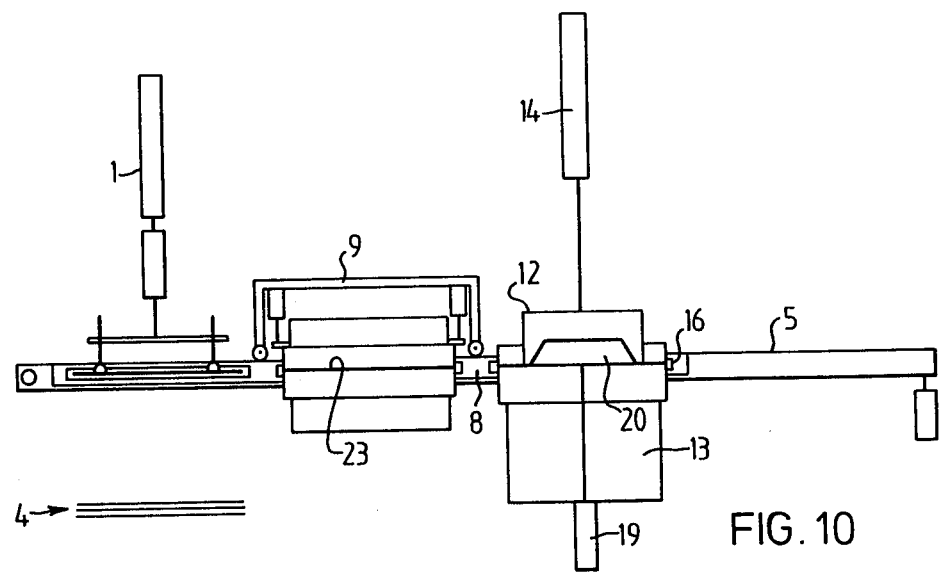

THERMOFORMING APPARATUS

BACKGROUND OF THE INVENTION

The invention relates to apparatus in which a sheet of thermoplastic material is softened and formed in a mould usually with the aid of a vacuum and/or fluid under pressure.

It is known to provide a single station thermoforming machine in which plastics sheet is loaded into the machine at the single working station and in which heaters can be moved into and out of the station to heat and soften the sheet while it is firmly clamped along all four edges in the station, the softened sheet subsequently being formed in the station and, after cooling, removed from the machine. With such a single station machine, because the sheet can be firmly clamped along all four edges and because it is possible to make the mould box an air tight chamber closed by the plastics sheet, it is possible to control sag in the sheet by adjusting the air pressure in the chamber. A single station machine is thus versatile in that it can cope with any mouldable thermoplastics material but it suffers from the disadvantage that it is slow in operation.

To speed-up the production cycle various high speed thermoforming machines have been proposed. One known high speed machine is a "shuttle" type machine which comprises a central forming station having heating stations on opposite sides of the forming station.

With such a machine, while one sheet is being heated in one of the heating stations, another sheet can be formed, unloaded and a fresh sheet loaded in the forming station. With a shuttle-type machine, not only is it the case that the heaters can only operate alternately so that they are idle for half of their working life but also it is the case that the speed of the machine is still usually governed by the period of time necessary to heat the sheet.

Rotary thermoforming machines are also known, and a three station rotary machine comprises a loading and unloading station, a heating station and forming station.

Since the sheet heating time is still critical with such a machine it is also known to provide a four station rotary machine, the extra station being a second sheet heating station. Four station rotary machines are relatively fast in operation but are complicated and thus expensive and are difficult to automate.

The extra expense is accounted for, at least in part, by the fact that each station must have its own sheet clamping frame and the difficulty in automation arises at least partly in the loading of sheet and unloading of the finished article. Normally such machines are loaded and unloaded manually.

To avoid at least some of the problems of these known machines it has been proposed to provide a so-called "in-line" machine in which the sheet is fed successively between loading, heating, forming and unloading stations arranged in a rectilinear array. Such a machine is capable of rapid operation since it can have as many heating stations as are required and of automatic loading and unloading but suffers from the disadvantage that hitherto it has not proved practical to maintain the sheet clamped on all four sides during its heating and during its transfer from the heating station to the forming station. Although it is theoretically possible to have an in-line machine consisting of a series of sheet clamping frames travelling in a closed loop, such a machine would be excessively expensive due to the large number of clamping frames which would be required. Also the time taken to adjust the clamping frames to cater for different sizes of plastics sheet would be unacceptably increased.

During the transfer the softened sheet tends to distort both due to sagging under gravity and/or due to an inherent tendency of plastics sheet to change shape when heated. As a result the conventional practice with in-line machines is to start with sheets which in their cold state are considerably larger than the finished article to allow for the shrinkage. While this was acceptable when the cost of plastics material was relatively low it is becoming increasingly less acceptable as time goes by especially since most plastics are based on oil.

At the heating station it is conventional to provide upper and lower heaters for example, infra-red quartz electric heaters which apply heat to the sheet until the plastics softens. It is known for the elements to be arranged in arrays on either side of the sheet and powered so that a predetermined pattern of heat is applied to the sheet in accordance with the shape of the article to be formed; thus where greatest forming of the thermoplastic material is required, these areas will be heated most and conversely for areas where little or no forming is required. This depends on each heating element being set to give a preset power output in accordance with the heating pattern to be applied to the thermoplastic sheet. With such preset power outputs heating of the thermoplastic sheet must be such as to avoid overheating the sheet locally and when thick thermoplastic sheets require to be formed, the time taken to heat the sheet determines the rate at which the thermoformings are produced. This limitation may therefore result in a higher cost per article produced.

It is furthermore a disadvantage of some plastics materials that they possess a very low hot strength and thus are difficult or impossible to thermoform on conventional high speed in-line apparatus, since during the transfer of the sheet it will tend to collapse.

It is an object of the invention to provide improved thermoforming apparatus.

SUMMARY OF THE INVENTION

From one aspect the invention provides thermoforming apparatus of the kind having a heating station and a forming station wherein at the heating station there are provided upper and lower heaters for softening the thermoplastics sheet material one of which heaters is moveable between the heating and forming station and is arranged to convey heated sheets from the heating station to the forming station. Preferably the upper heater is the moveable heater and means is provided for securing the plastics sheet to the moveable heater so that it can be conveyed between the heating and forming stations. The upper heater may be in the form of a chamber which is adapted to be closed by the sheet, the arrangement being such that the air pressure in the chamber can be varied to control sag in the sheet. For this purpose the marginal portion of the sheet is sealed against the heater chamber in any convenient manner. The sealing means and the gripping means may be combined in a continuous vacuum seal.

The thermoforming apparatus may comprise a sheet loading station, a heating station, a forming station and an unloading station and means for conveying the sheet to be formed between the stations, the conveying means comprising a guide track extending between the stations, a carriage on the guide track, sheet gripper means on the carriage, the carriage being moveable between adjacent stations whereby the sheet can be moved stepwise between the stations, and wherein the guide track is pivoted at one end for vertical movement, means being provided for moving the guide track about its pivot to provide clearance to enable the sheet to be advanced between successive stations.

It may be possible to replace the conveying means described above by conveying means comprising feed chains formed for example with spikes for engaging and gripping the sheets or by conveying means comprising pairs of contra-rotating belts between which the sheets are gripped.

From another aspect there is provided a method of heating a plastics sheet comprising applying heat at a given level to the sheet from a heat source of low thermal inertia and successively or continuously reducing the level of heat applied to the sheet as the temperature of the sheet rises. The heat source may comprise one or more infra-red quartz electric resistance heaters. Preferably the method comprises continuously monitoring the temperature of the sheet at at least one location e.g. by means of an optical pyrometer. The method also preferably comprises monitoring the main voltage to the heating source and applying compensation if necessary to avoid unintended fluctuations in the level of heating energy applied to the sheet.

The method of heating a sheet of a thermoplastic material for use in a thermoforming process may comprise initially applying maximum heat available to the sheet, monitoring the temperature of the sheet, comparing the monitored temperature of the sheet with the temperature of a predetermined temperature response of the same material, and controlling the heat applied to the sheet in accordance with the predetermined temperature response and in accordance with the monitored temperature so that the thermoplastic sheet is in a suitable condition to be thermoformed.

Preferably said method comprises sensing when the said sheet is suitable for thermoforming and removing the sheet from the applied heat.

From another aspect the present invention is apparatus for controlling the heat applied to a sheet of thermoplastics material for use in a thermoforming process comprising, arrays of heat applying elements disposed above and below the sheet for heating the sheet, heat sensing means being connected to a microprocessor control unit or the like, the heat applying elements being connected to heating control devices, said heating control devices also being connected to the microprocessor control unit, the microprocessor control circuit have data storage means connected therewith, and data corresponding to a predetermined temperature response of the material being heated stored in said storage means whereby, in use, the heating of said array of elements and the monitoring of the temperature is carried out in accordance with said predetermined temperature response and the monitored temperature.

Preferably said heating elements are infra-red quartz electric heaters of low thermal inertia.

Preferably said heat sensing means is a non-contact infra-red pyrometer.

Preferably the heating control devices are triacs.

BRIEF DESCRIPTION OF THE DRAWINGS

The invention is diagrammatically illustrated by way of example in the accompanying drawings in which:

FIGS. 2 to 14 are side views similar to that of FIG. 1 but showing the machine during the various parts of its operating cycle;

DESCRIPTION OF THE INVENTION

Figure 1:
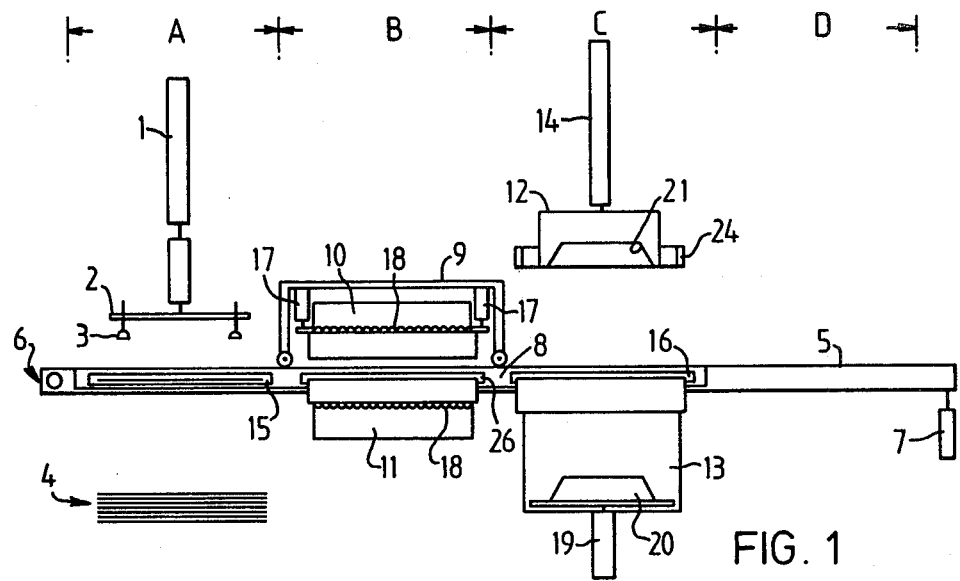
FIG. 1 is a side view of thermoforming apparatus showing the machine at rest.

In FIG. 1 there is shown thermoforming apparatus comprising a spaced parallel pair of beams (5), only one of which is seen in the drawing, which form a guide track on which is mounted a sheet transfer carriage (8) for reciprocation along the track by means (not shown). The beams (5) define four working stations namely a loading station A, a heating station B, a forming station C and an unloading station D. The sheet transfer carriage 8 extends over three of the four stations and is formed with sheet grippers (15, 26 and 16 respectively) corresponding to the three stations.

The loading station A comprises a two stage sheet loading unit (1) comprising two hydraulic or pneumatic rams linked end to end, which unit carries at its lower end arms (2) supporting suction grippers (3) by means of which a plastics sheet can be lifted from a stack (4) of such sheets and raised into a position where it can be gripped by grippers (15) on the carriage (8).

The heating station B comprises upper and lower heaters (10 and 11 respectively) each of which comprises a bank of infra-red quartz electric heater elements (18). In the interests of clarity the elements (18) are indicated in FIG. 1 only. The lower heater (11) is fixed on the machine frame (not shown) but the upper heater is mounted on a carriage (9) for reciprocation along the beams (5) by means (not shown) and is mounted for vertical movement relative to the carriage (5) on hydraulic or pneumatic rams (17). The upper and lower heaters (10 and 11) comprise generally rectangular housings which when the upper heater is lowered will form a closed heating chamber in which a plastics sheet can be softened. During this period the plastics sheet is gripped between the peripheral portions of the respective housings. In addition the upper heater is formed with grippers (not shown) by means of which the sheets can be held in contact with the upper heater when they are out of contact one with the other. These grippers may be mechanical or pneumatic and may extend completely round the periphery of the heater housing so that with a plastics sheet engaged the heater forms a hermetically sealed chamber which can be partially evacuated if necessary to control sag in a heated plastics sheet.

The forming station C comprises a lower mould box (13) and an upper mould box (12) which carry male and female mould members (20 and 21 respectively) by means of which a heated sheet is moulded to the required shape usually with the aid of vacuum and/or fluid pressure. The lower mould box (13) is fixed to the machine frame but the mould member (20) is vertically moveable in the mould box (13) by means of an hydraulic or pneumatic ram (19). The upper mould box (12)

and its associated mould member (21) is vertically moveable to bring the male and female mould members into its working position by means of an hydraulic or pneumatic ram (14). The upper mould box is surrounded by an independently vertically moveable clamping frame (24).

The beams (5) are pivoted about a horizontal axis at their end (6) and can be pivoted about the axis by means of an hydraulic or pneumatic ram (7) disposed at the ends of the beams (5) which are remote from the ends (6), that is to say at or adjacent to the unloading station D.

Figure 2:
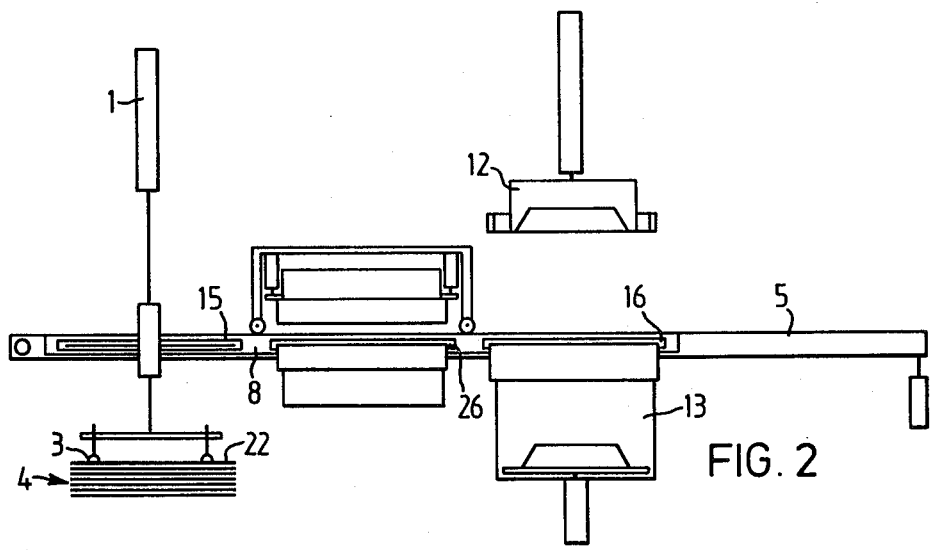
Figure 3:
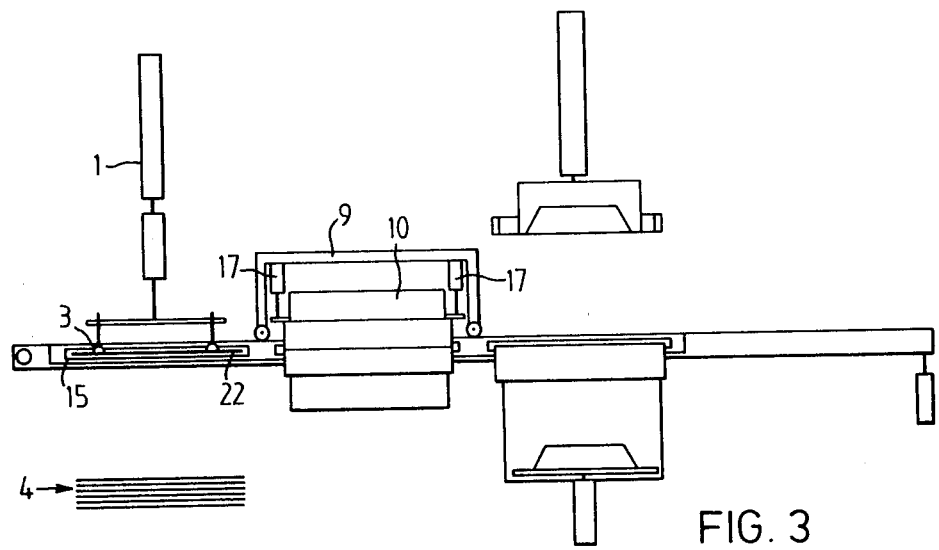
Figure 4:
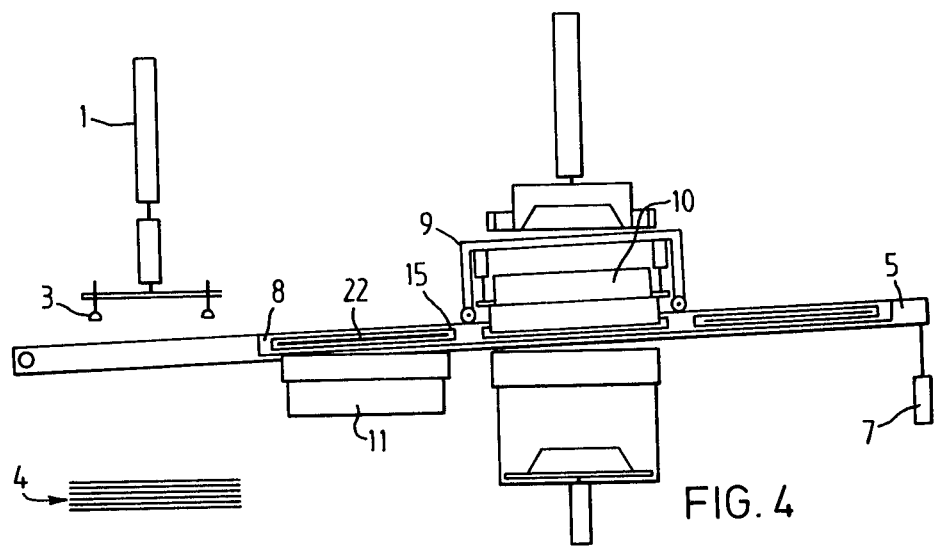

In FIG. 1 of the drawings the machine is shown at rest. In FIG. 2 the ram (1) has been fully extended so that the suction grippers (3) engage and grip the top sheet of plastics (22) on stack (4). In FIG. 3 the ram (1) has been partly retracted to bring the sheet (22) into position for engagement by the grippers (15) on the carriage (8). Once the grippers (15) have engaged the sheet (22) the suction grippers (3) release the sheet. It will also be seen that the rams 17 have been extended to move the upper heater 10 into its lower position. In FIG. 4 the ram (1) is retracted fully, the ram (7) is extended to raise the beams (5), and the carriage (8) is indexed forwards (to the right as seen in the drawing) so that the sheet (22) held by the grippers (15) is brought into the heating station B. At the same time the upper heater carriage (9) moves forward into the forming station C.

Figure 5:
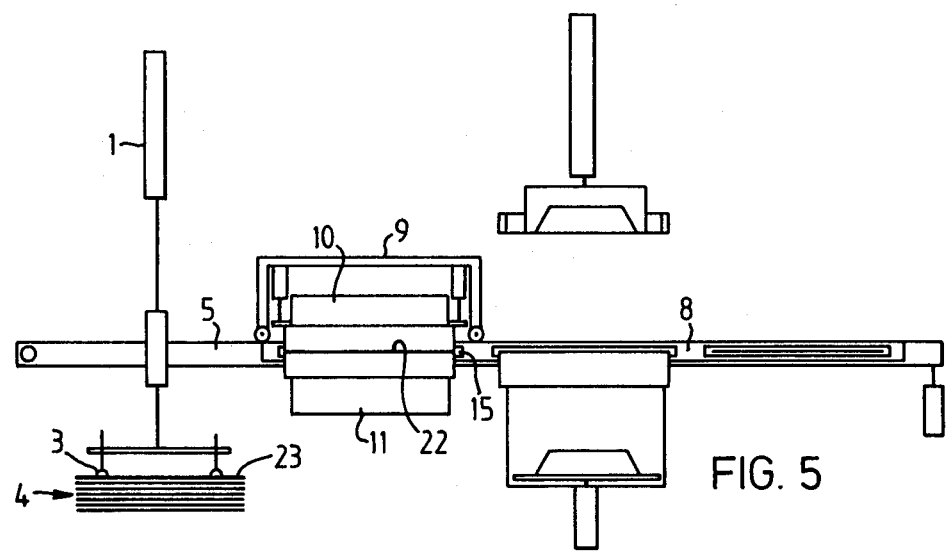

In FIG. 5 the beams (5) have been lowered into their horizontal position, the ram (1) has been fully extended so that the grippers engage a further plastics sheet (23) on the stack (4), the upper heater has been raised, the carriage moved back to the heating station B after which the upper heater (10) is lowered so that the sheet (22) is gripped between the upper and lower heaters. The grippers (15) are then operated to release the sheet (22) and the heaters (10 and 11) are energised to soften sheet (22) retained therebetween. During this period the sheet may additionally be held by means of the grippers on the respective heaters.

Figure 6:
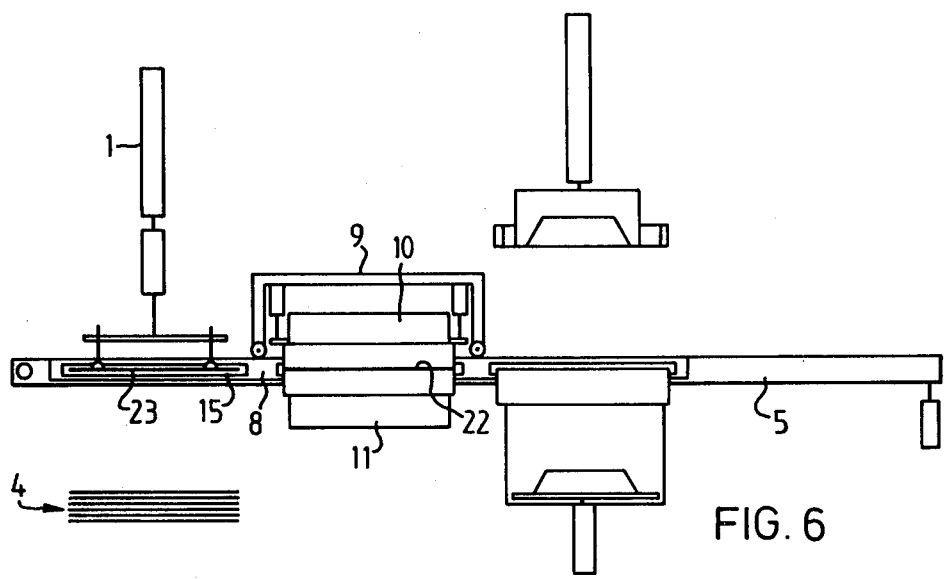

Referring now to FIG. 6 once the grippers (15) have released the sheet (22), the carriage (8) can be indexed rearwards into the position in which the grippers (15) can grip the sheet (23) which has been raised into position by a partial retraction of ram (1). At the same time the sheet (22) is gripped by the grippers (26) on the carriage (8) and the sheet is heated.

Figure 7:
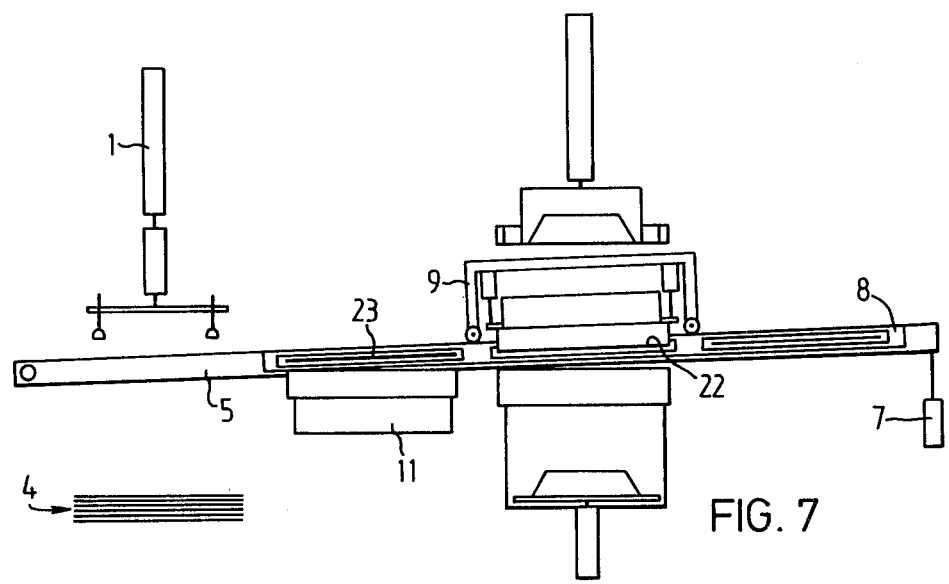

As shown in FIG. 7 while the above described sheet loading sequence continues the lower heater is switched off. The beams are then raised so that the upper heater moves upwardly while still gripping the sheet (22). The sheet (22) is also held by the grippers (26). Thus during heating and transferring of the plastics sheet from the heating station to the forming station, the sheet is gripped along two opposite edges by the grippers (26) whilst along its two edges extending tranversely of the beams (5) it is gripped by vacuum grippers on the upper heater (10). It will be appreciated that during transfer of the heated sheet the motion of the carriage (9) will be synchronised with that of the carriage (8). The gripper carriage (8) is indexed forwards to bring the sheet (23) into the heating station and the upper heater (10) is indexed forwards along the guide track to bring the sheet (22) into the forming station.

Figure 8:
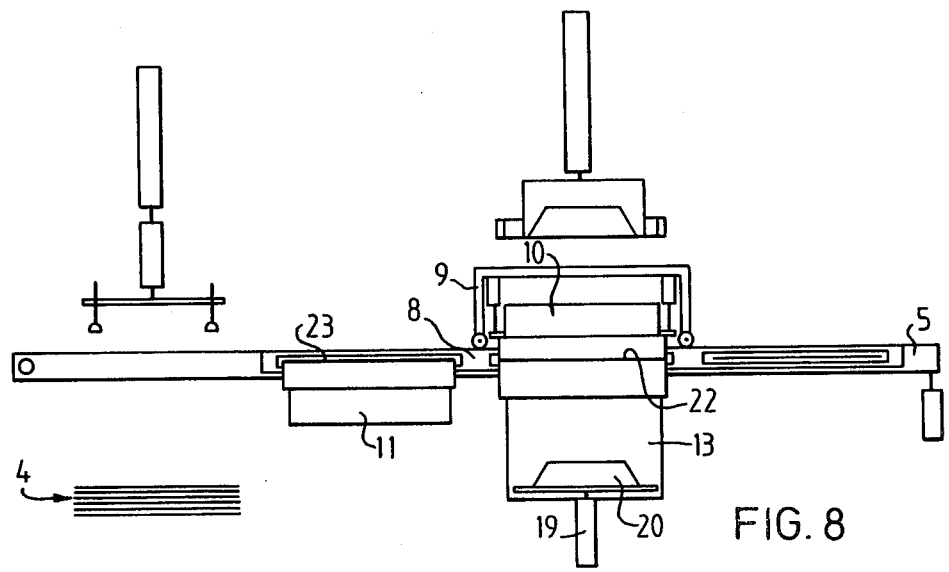

Referring now to FIG. 8 of the drawings the beams (5) have been lowered into the horizontal position, to bring the sheet (22) into engagement with the lower mould box (13) which is then made to grip the sheet for example by vacuum grippers (not shown). The sheet grippers on the upper heater (10) then disengage the sheet.

In FIG. 9, upper heater (10) has been raised vertically from the position shown in FIG. 8, and the carriage (9) has been indexed rearwards to a position above the lower heater (11) and the heater (10) lowered again to grip the sheet (23) between the upper and lower heaters in the manner previously described. Meanwhile the clamping frame (24) is moved vertically downwards by means (not shown) to clamp the marginal portion of the softened sheet (22) against the top of the mould box (13). The grippers (26) on the carriage (8) then release the sheet (22). It will be appreciated that during this period the sheet loading ram (1) is continuing through its operating sequence as previously described.

In FIG. 10 the upper mould box (12) has been lowered and the male mould member (2) has been raised so that the softened plastics sheet is formed into the desired shape. The carriage (8) is indexed rearwardly and the grippers (16) on the carriage (8) are actuated to grip the formed moulding. During this period the sheet loading and heating operations continue as previously described.

Figure 11:
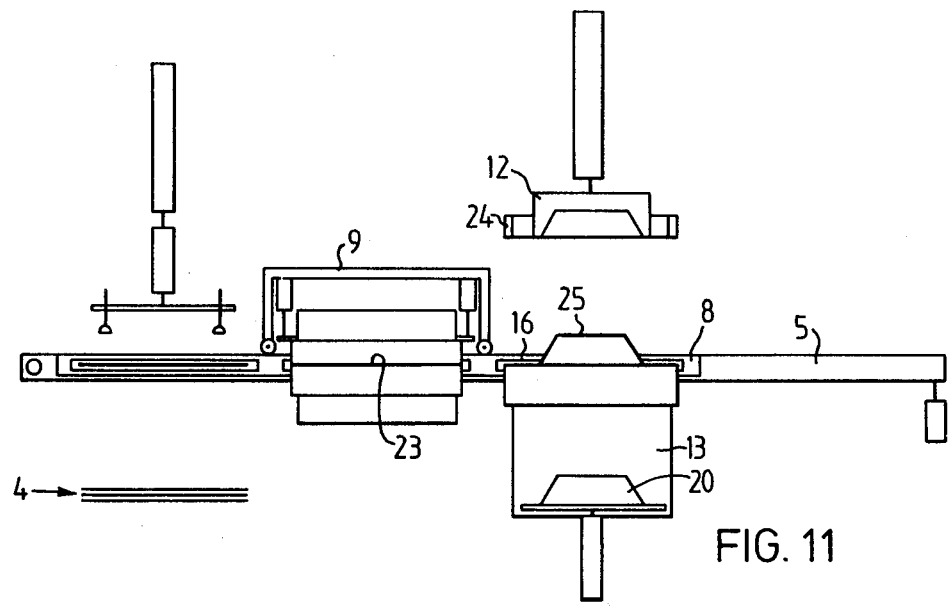

Referring to FIG. 11 the upper mould box (12) and the clamping frame (24) are retracted upwardly and the member (20) is retracted downwardly to leave the formed moulding (25) held by the grippers (16). The vacuum grippers on the mould box (13) are deactivated. During this period the sheet loading and heating operations continue as previously described.

Figure 12:
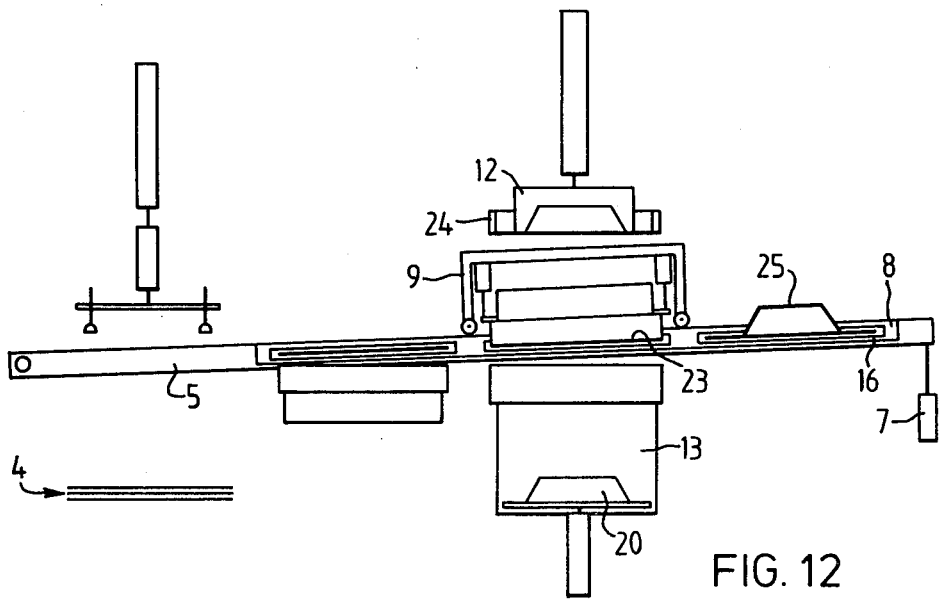

In FIG. 12 the beams (5) are shown raised and the gripper carriage (8) is shown indexed forwards to bring the finished moulding (25) into the unloading station D. The previously described loading, heating and forming sequences for subsequent plastics sheets meanwhile progress through the various stages described above.

Figure 13:
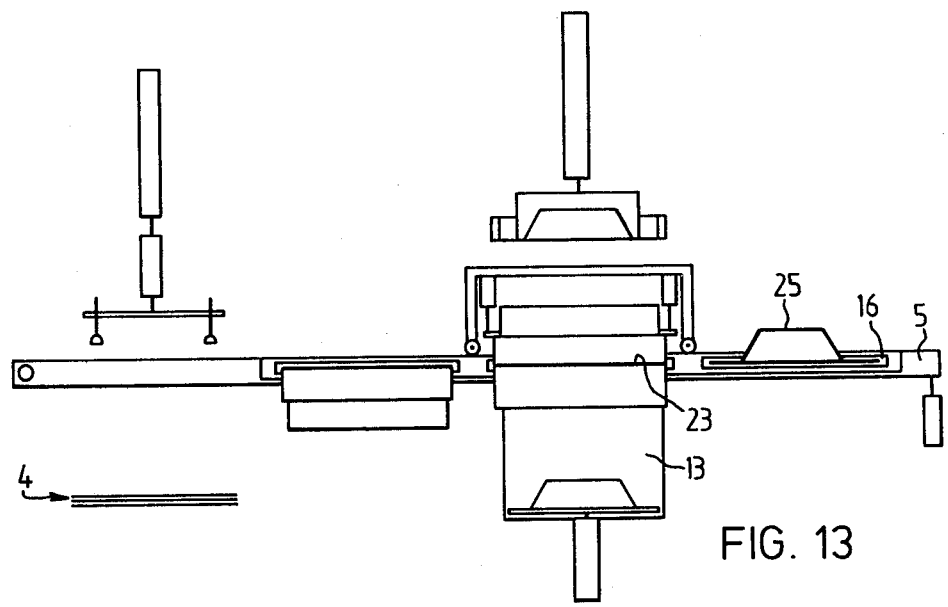

FIG. 13 shows the position with the beams (5) lowered, the mould box (13) vacuum grip actuated to grip the sheet (23) and the vacuum grip of the heater (10) de-activated so that the upper heater can be retracted to the heating station.

Figure 14:
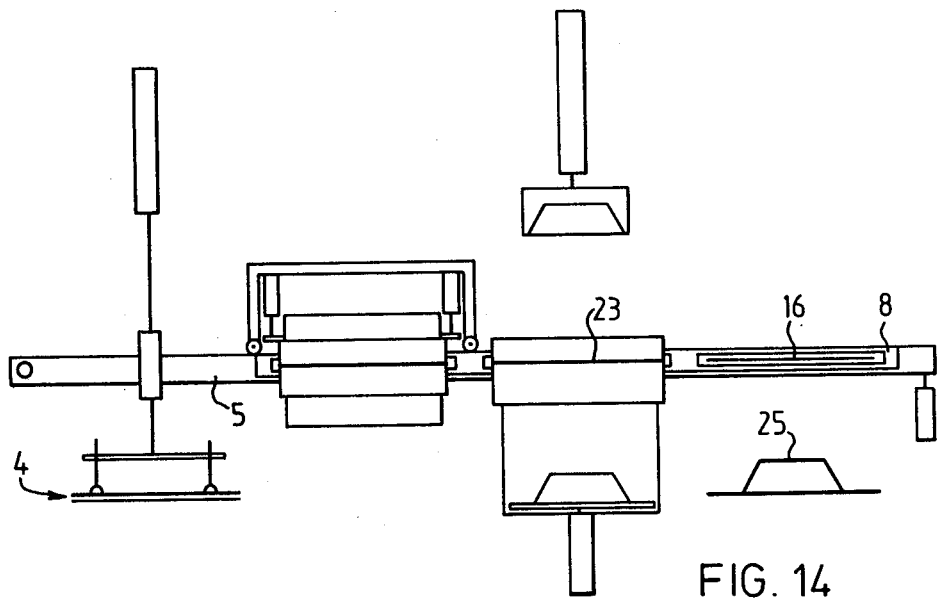

FIG. 14 shows that the grippers (16) on carriage (8) have released the finished moulding (25) and that the cycle of operations on subsequent sheets has progressed one step. The cycle of operations then continues as previously shown so that each sheet is moulded as described for the sheet (22).

Figure 15:
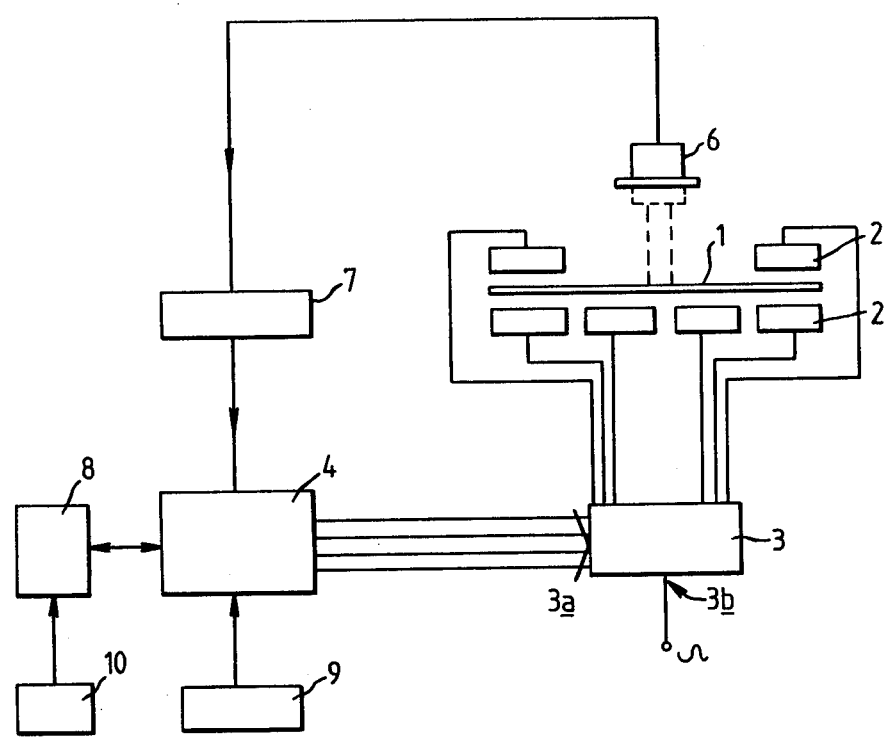
FIG. 15 is a block diagram of apparatus according to the present invention.
Figure 16:
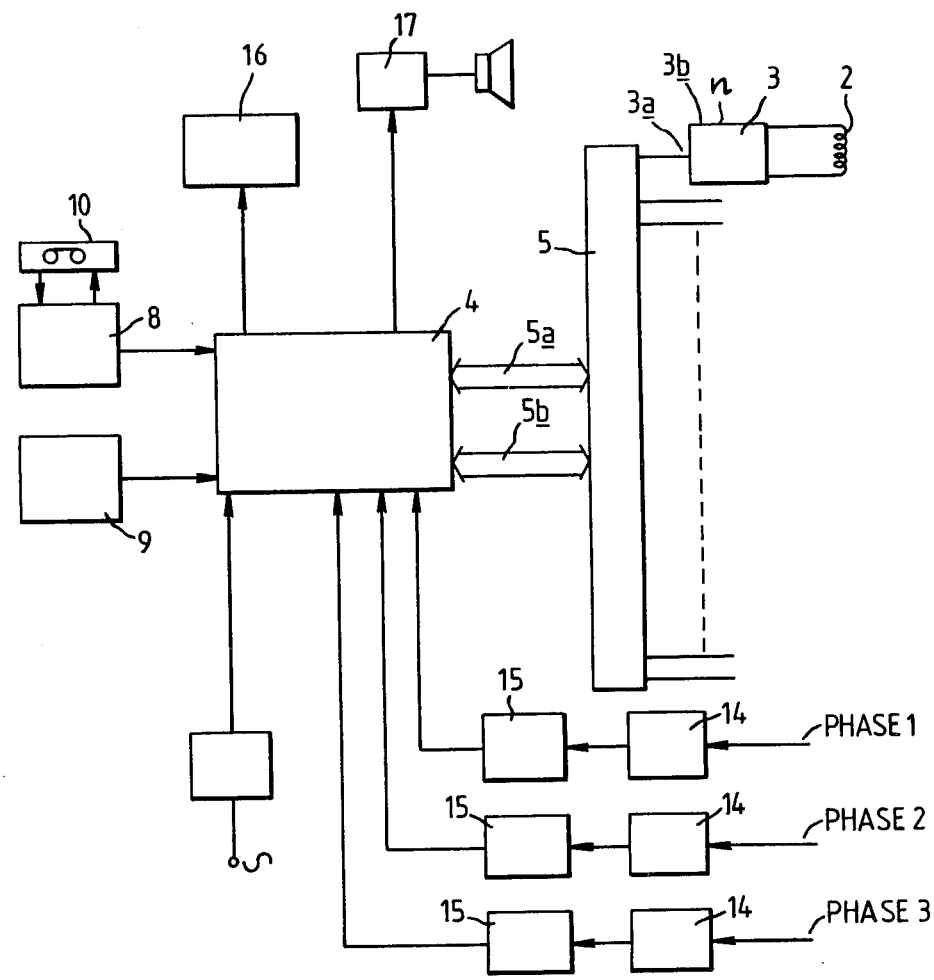
FIG. 16 is a diagram similar to FIG. 15 but in more detail and with additional components.

Referring now to FIGS. 15 to 18 of the drawings, FIG. 15 shows a sheet (1) of thermoplastics material located between two arrays of infra-red quartz heating elements (2). Each heating element (2) is connected to a triac (3), which has two inputs 3a and 3b; each input 3a being connected to a microprocessor (4), via a latching and decoding circuit (5) and address and data buses 5a, 5b and each input 3b being connected to one side of a.c. mains power (FIG. 16). The other side of the a.c. mains supply is connected to one end of each heating element (2). A pyrometer (6) is located opposite the sheet (1) (FIG. 15) for monitoring the temperature of the sheet, the pyrometer being connected to the microprocessor (4) via an interface (7) which amplifies the pyrometer (5) signal to facilitate use with the microprocessor (4) (FIG. 15).

Figure 17:
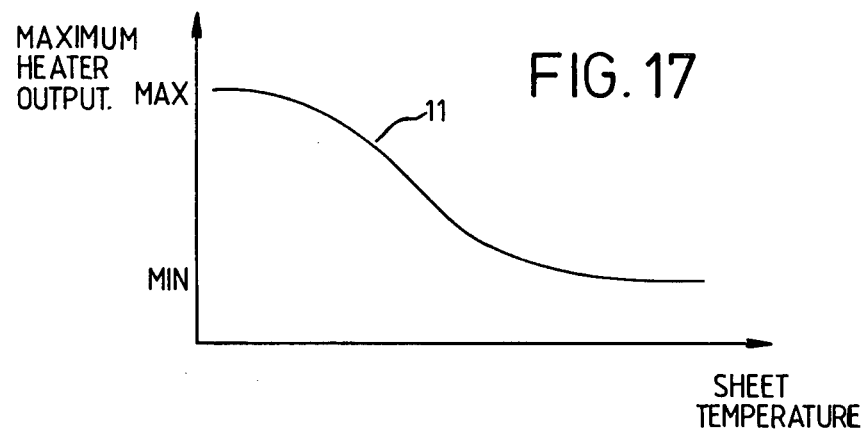
FIG. 17 is a typical graph of heater element output versus sheet temperature for a thermoplastic material.

The microprocessor (4) is connected to a data store (8) which contains a preprogrammed set of data corresponding to the temperature response (11) of the particular thermoplastic material being formed for maximum heater output initially applied as shown in FIG. 17. It will be readily understood that experiments are performed on each thermoplastic material used in thermoforming to determine the particular temperature/heater output response curve. Once these response curves are obtained the data is then transferred to a data store such as a cassette tape or a cartridge or disc. The microprocessor (4) may also be controlled directly from a keyboard terminal (9) or from data stored in a tape cassette (10), or from a disc drive or cartridge (not shown).

In use, in response to data entered from the keyboard (9) or from stored data in the store (8), the microprocessor (4) switches on the triacs (3) to connect the heating elements (2) to a.c. mains power in accordance with the preprogrammed data, and the pattern of elements (2) powered is in accordance with the particular article to be formed. The heating elements (2) are of low thermal inertia infra-red quartz type and consequently they heat up rapidly to maximum power which is applied to the sheet (1). As the heating elements (2) are driven at maximum output the temperature of the sheet (1) rises rapidly so that if applied for too long the sheet (1) would begin to degrade. To avoid the sheet degrading yet to supply enough heat to the sheet to cause it to soften to permit thermoforming in the minimum of time, the pyrometer (6) monitors the temperature rise and sends signals via the interface (7) to the microprocessor (4). These signals cause further execution of the data corresponding to the preprogrammed temperature response curve (11) for the particular thermoplastic material being heated. The microprocessor provides further output signals in accordance with data corresponding to this curve (11) which reduces the period for which the triacs (3) are switched on, hence the heating power applied to the heating elements (2) is consistent with the thermoplastic sheet (1) not degrading but is sufficient to heat the sheet (1) to be thermoformed.

The microprocessor output signal which controls the switching of each triac (3) via the latching and decoding circuit (5) is in the form of an oscillating signal with a frequency of 50 Hz and when the pyrometer (6) sends a signal to the microprocessor (4) the period for which the triacs (3) are turned on is reduced in accordance with the stored data corresponding to curve (11). For example the period may be 'chopped' so that only 40 cycles or 10 cycles switch the triac on for 80% or 20% of the time respectively, the triacs (3) being switched off for longer as the temperature of the sheet rises (FIG. 17).

Figure 18:
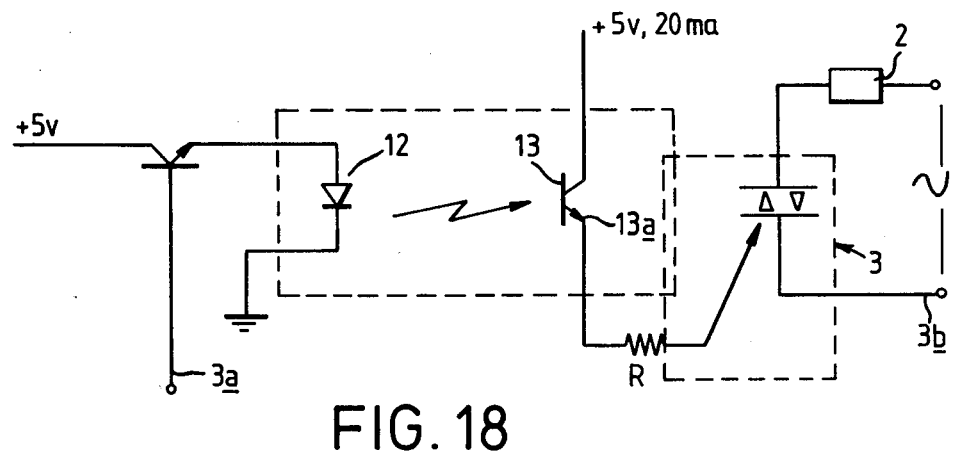
FIG. 18 is a part of the apparatus shown in FIGS. 15 and 16 shown in more detail.

The circuit shown in FIG. 18 is reference (3) in FIGS. 15 and 16 but shown in more detail. The output 3a to the microprocessor (4) is optically isolated using a light emitting diode (12) and phototransistor (13), and the output 13a of the phototransistor is connected to the triac (3). This circuit applies a zero-switching technique which means that the microprocessor signal is split at the zero crossover point to provide accurate control of the power applied to the heating elements, unlike the conventional heating circuit in which the power cycle can be interrupted at any point in the cycle to provide less rigorous power control.

The control circuit also includes rectifying means (14) and analogue to digital (A/D) converting means (15) connected between each phase of a 3-phase supply and the microprocessor (4) as shown in FIG. 16.

Without departing from the scope of the invention it will be understood that several modifications may be made to the apparatus as shown in FIGS. 15 and 16. For example a digital display (16) could be connected to the microprocessor (4) to display values of sheet temperature or the like and an alarm unit (17) could also be connected to the microprocessor (4) to indicate the failure of a heating element or any other component. The microprocessor (4) is preferably of the Z80 8-bit type although other microprocessor could be used. The pyrometer (6) may be replaced by another type of pyrometer which includes an amplifier thereby dispensing with the need for interface (7), however this alternative pyrometer is also more expensive.

Advantages of the present invention are that the heating program for each particular thermoplastic material can be quickly and easily changed, giving flexibility of production. Only one heating stage is required for each thermoplastic material independent of the thickness of the material since the heating circuit supplies just enough heat to soften but not melt the material, and the heating operation is more efficient in the utilisation of heat energy.

I claim:

1. Thermoforming apparatus of the kind having a heating station and a forming station wherein at the heating station there are provided upper and lower heaters for softening the thermoplastics sheet material, means for moving one of said heaters between the heating and forming stations, and means on the movable heater for gripping the plastics sheet along substantially the whole of its periphery whereby the movable heater is arranged to convey heated sheets from the heating station to the forming station while preventing shrinkage of the sheet.

2. Thermoforming apparatus according to claim 1, wherein the upper heater is the moveable heater.

3. Thermoforming apparatus according to claim 2, wherein the upper heater is in the form of a chamber which is adapted to be closed by the sheet, the arrangement being such that the air pressure in the chamber can be varied to control sag in the sheet.

4. Thermoforming apparatus according to claim 3, comprising means for sealing the marginal portion of the sheet against the heater chamber, and wherein the sealing means and the gripping means is combined in a continuous vacuum seal.

5. Thermoforming apparatus comprising a sheet loading station, a heating station, a forming station and an unloading station which stations are disposed in a rectilinear array, and means for conveying a sheet to be thermoformed between the stations, the conveying means comprising a guide track extending between the stations, a carriage on the guide track, a heater mounted on the carriage for movement therewith, sheet gripper means on the carriage for gripping the sheet on all sides to prevent shrinkage thereof when heated, means for moving the carriage between adjacent stations and means for moving the guide track vertically to provide clearance to enable the sheet to be advanced between successive stations.

6. The apparatus according to claim 5, wherein said guide track is pivoted at one end.

7. The apparatus according to claim 1, including means for controlling said heaters for applying heat at a given level to the material from a heat source of low thermal inertia and successively or continuously reducing the level of heat applied to the material as the temperature of the material rises.

8. The apparatus according to claim 7, comprising means for sensing when the said material is suitable for thermoforming and removing the material from the heater.

9. Apparatus according to claim 8, wherein said heat sensing means is connected to a microprocessor control unit and said heating control means is connected to the microprocessor control unit, said microprocessor control circuit having data storage means connected therewith, and data corresponding to a predetermined temperature response of the material being heated stored in said storage means whereby, in use, the heating of said array of elements and the monitoring of the temperature is carried out in accordance with said predetermined temperature response and the monitored temperature.

10. Apparatus according to claim 9, wherein said heating elements are infra-red quartz electric heaters of low thermal inertia.

11. Apparatus according to claim 9, wherein said heat sensing means is a non-contact infra-red pyrometer.

12. Apparatus according to claim 9, wherein the heating control devices are triacs.

* * * * *